(12) United States Patent
Le Vavasseure

(10) Patent No.: US 11,534,028 B2
(45) Date of Patent: Dec. 27, 2022

(54) MIXING APPLIANCE HAVING ACTUATOR WITH MAGNETIC RETENTION

(71) Applicant: ROBAND AUSTRALIA PTY LTD, Cromer (AU)

(72) Inventor: Paul Le Vavasseure, Berowra (AU)

(73) Assignee: ROBAND AUSTRALIA PTY LTD, New South Wales (AU)

( * ) Notice: Subject to any disclaimer, the term of this patent is extended or adjusted under 35 U.S.C. 154(b) by 250 days.

(21) Appl. No.: 16/892,872

(22) Filed: Jun. 4, 2020

(65) Prior Publication Data

US 2020/0383525 A1    Dec. 10, 2020

(30) Foreign Application Priority Data

Jun. 4, 2019   (AU) ................................ 2019901934

(51) Int. Cl.
*A47J 43/042*         (2006.01)
(52) U.S. Cl.
CPC .................................. *A47J 43/042* (2013.01)

(58) Field of Classification Search
CPC ...................... A47J 43/042; A47J 2043/04463
USPC ............................................................ 366/197
See application file for complete search history.

(56) References Cited

U.S. PATENT DOCUMENTS

| 2,300,542 | A  | * | 11/1942 | Forse ................... | B01F 27/805 |
|   |   |   |   |   | 366/206 |
| 3,292,912 | A | * | 12/1966 | Stubler ................ | A47J 43/044 |
|   |   |   |   |   | 366/347 |
| 2003/0142581 | A1 | * | 7/2003 | Barton .................... | B01F 29/83 |
|   |   |   |   |   | 366/601 |
| 2008/0101155 | A1 | * | 5/2008 | Olson .................... | B01F 35/60 |
|   |   |   |   |   | 366/206 |
| 2011/0235462 | A1 | * | 9/2011 | Branson, III ......... | B01F 27/805 |
|   |   |   |   |   | 366/206 |

* cited by examiner

*Primary Examiner* — Marc C Howell
(74) *Attorney, Agent, or Firm* — Ladas & Parry LLP

(57) ABSTRACT

An appliance including a housing, an actuator movable relative to the housing, a switch disposed within the housing, at least one set of repelling magnets configured to remotely operate the switch; and at least one set of attracting magnets configured to retain the actuator on the housing.

12 Claims, 4 Drawing Sheets

US 11,534,028 B2

MIXING APPLIANCE HAVING ACTUATOR WITH MAGNETIC RETENTION

FIELD

The present invention relates to an electric mixer, and in particular, but not exclusively to an electric mixer for mixing drinks.

BACKGROUND

Spindle type drink mixers typically use point of sale paper cups or reusable metal cups to mix the drinks in. These mixers have either a manually operated switch or a mechanically operated switch which is actuated by the drink cup. Regulations for these mixers also require that the electrical components of these mixers are enclosed within a housing for safety reasons and that the housing is easy to clean without any dirt traps that could harbour bacteria or allow ingress of vermin.

As the regulations require electrical components to be protected and operators prefer a switch that is operated by the mixing cup, the end result is that the operating switches require a penetration into the electrical housing for the mechanisms to connect between the cup and the switch.

These openings traditionally have created problems for both designers and operators. As these mixers are used for mixing sweetened drinks, typically milkshakes, problems are caused by the mixture when it splashes out of the cups onto the mechanisms. The reasons for the splashing are varied and difficult to control i.e. over filling cups, liquid viscosity, mixing in ice-cream or other thickening agents as well as operator error. The liquids can be drawn into the housings via the operating mechanisms where they can dry out causing the mechanisms to bind up sometimes leaving the mixer in the operating position.

The designer is prevented from designing an activating mechanism that utilizes too strong a return spring for the switch mechanism due to the weakness in the structure of paper cups, if the return spring is too strong then it can lead to the edge of the cup collapsing causing an even larger spill.

Some manufacturers have designed switch actuators that can be removed from the housing for cleaning however this arrangement does not necessarily prevent liquid from migrating inside the body of the mixer where it can cause problems.

The use of rubber seals and protective bellows has also been investigated however due to them being in what is referred to as the 'food zone,' (an area that the drink mixture is in contact with during mixing or where the liquid could splash onto then drip back into the mixture during mixing) there are special requirements as to the type of material being used. While it is possible to design such a system it could potentially be expensive to build.

The ideal mixer housing would be one that has no openings in the 'food zone,' although this would be unrealistic as an opening is required for the mixing spindle. However, it is possible to move the outer switch actuator point out of the food zone as long as it switches on and off at the same point i.e. when the mixing spindle is fully immersed in the mixture. If the spindle is still rotating fast when withdrawn from the mixture it sprays mixture over the mixer and the operator.

Moving the outer actuator away from the food zone does not eliminate the need to have a penetration in the housing where it can still present a cleaning issue.

SUMMARY OF INVENTION

In one aspect the present invention provides an appliance including:
a housing;
an actuator movable relative to the housing;
a switch disposed within the housing;
at least one set of repelling magnets configured to remotely operate the switch; and at least one set of attracting magnets configured to retain the actuator on the housing.

Preferably, the appliance is a mixer

Preferably, at least one set of repelling magnets includes a first repelling magnet disposed within the housing and a second repelling magnet disposed on the actuator.

Preferably, at least one set of attracting magnets includes a first attracting magnet disposed within the housing and a second attracting magnet disposed on the actuator.

Preferably, the actuator is removable from the housing.

Preferably, the actuator is movable between an off position and an operating position, wherein in the off position, the attracting magnets align to secure the actuator to the housing.

Preferably, in the operating position the repelling magnets align to remotely activate the switch, and the actuator is secured to the housing via mechanical means.

Preferably, the mechanical means includes tab portions extending from the actuator and being slidable within corresponding recesses on the housing.

In one embodiment the appliance includes a lever mechanism pivotably connected within the housing and operatively associated with the repelling magnets to activate the switch.

Preferably, the actuator is biased toward the off position.

In one embodiment the appliance is a drink mixer.

Preferably, the drink mixer includes a support member extending from the housing and through an aperture in the actuator, the support member configured to engage a bottom portion of a container.

Preferably, the drink mixer includes a retaining member configured to engage a top portion of the container.

BRIEF DESCRIPTION OF DRAWINGS

A preferred embodiment of the invention will now be described with reference to the accompanying drawings, wherein.

DESCRIPTION OF EMBODIMENTS

Figure 1:
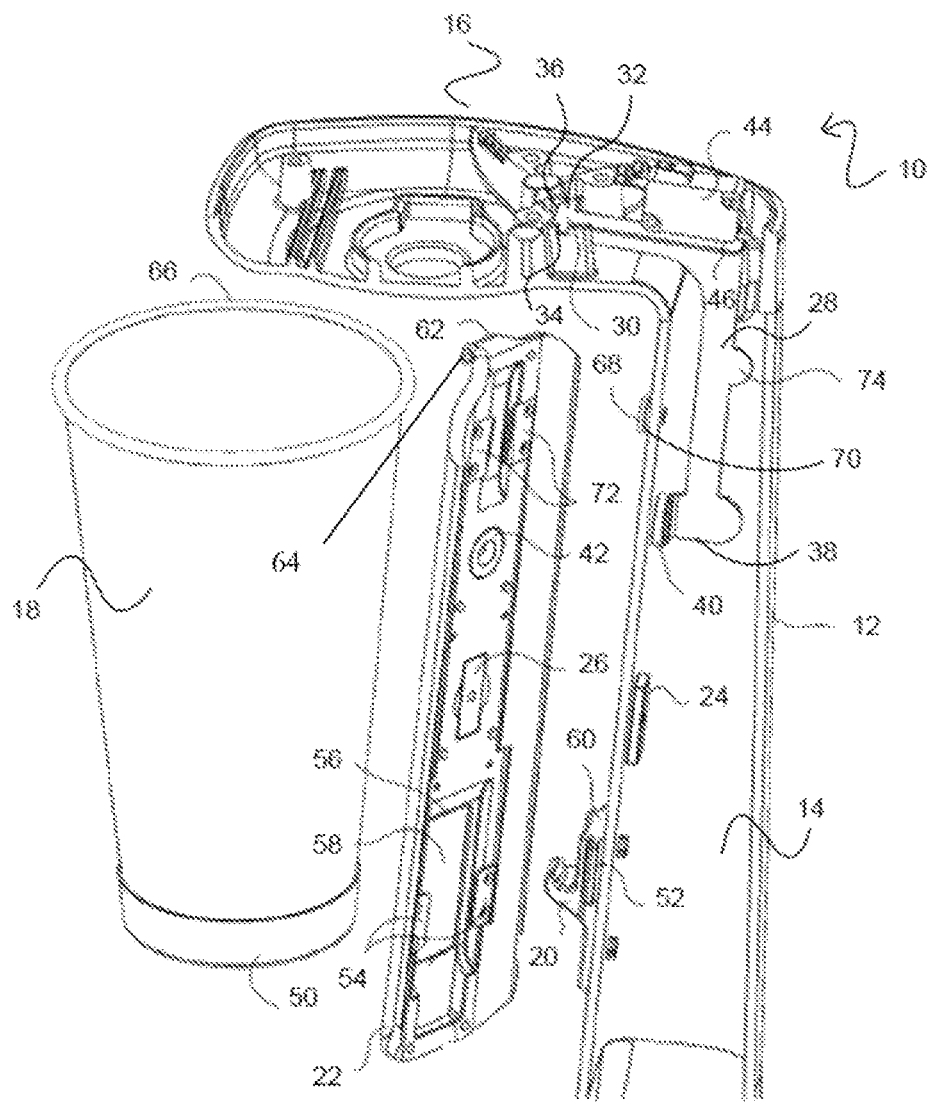
FIG. 1 is a schematic view of an appliance in accordance with an embodiment the present invention.
Figure 2:
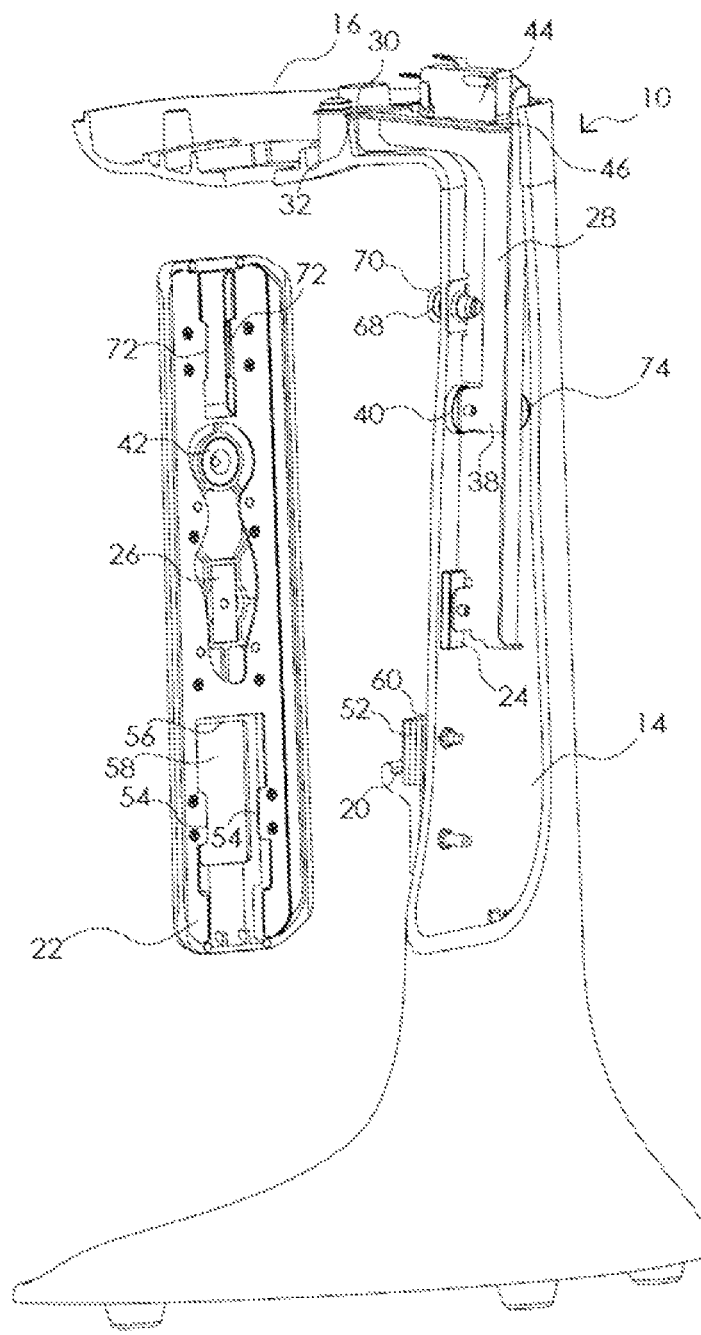
FIG. 2 is a cross sectional view of the appliance of FIG. 1.
Figure 3:
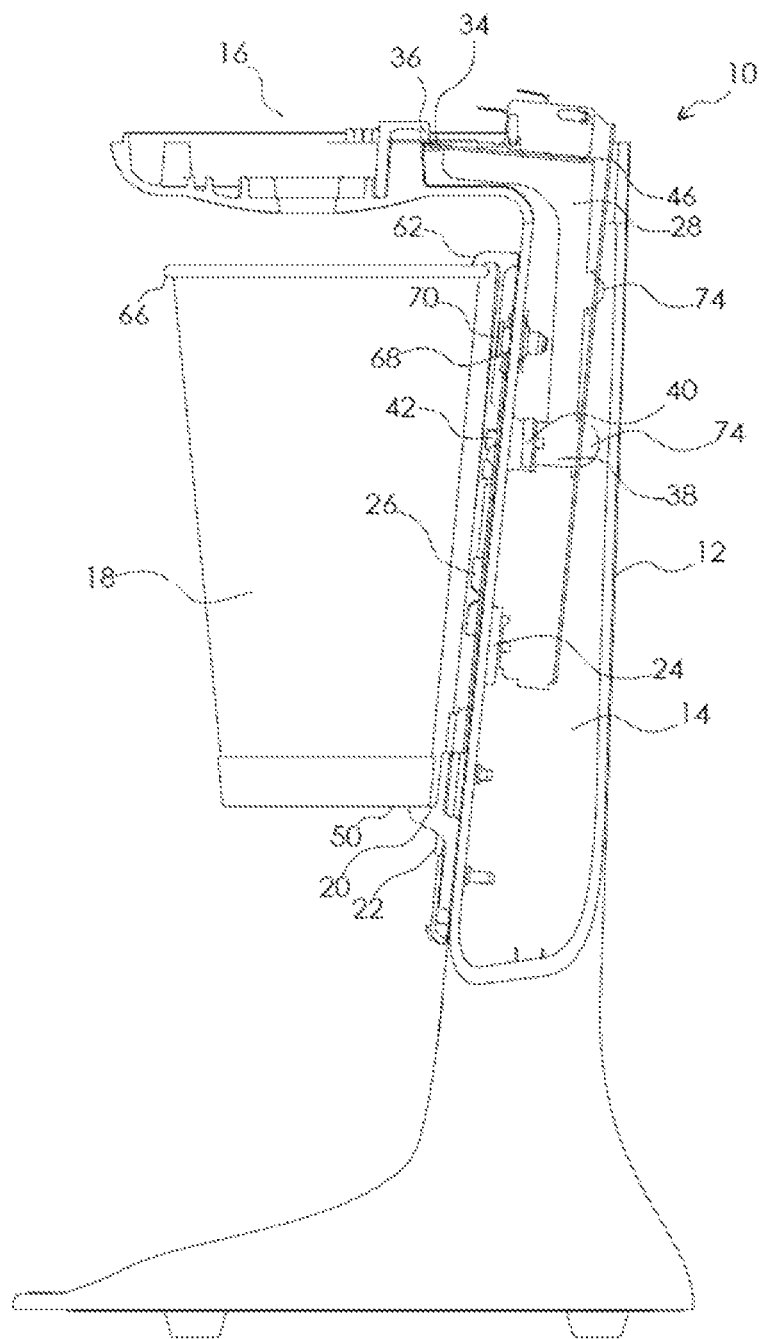
FIG. 3 is a cross sectional view of the appliance of FIG. 1.

FIGS. 1 to 4 illustrate an appliance, in the form of a drink mixer 10, in accordance with an embodiment of the present invention. The drink mixer 10 includes a housing 12 (only part shown) having a longitudinal vertical portion 14 and a transverse horizontal portion 16. The housing 12 is designed to receive a container, or a cup 18.

The skilled addressee will recognize that the drink mixer 10 is but one embodiment of the appliance of the present invention. The appliance switching arrangement of the present invention can be applied to a number of appliances where leaving the appliance on either presents a physical danger or is a waste of energy.

On the outside of the housing 12 is a fixed lower support member 20 and a movable actuator 22. The actuator 22 is secured to the vertical portion 14 of the housing 12 using magnets 24, 26. The first magnet 24 is positioned on an inside surface of the housing 12 and the second magnet 26 is positioned on the actuator 22. The magnets 24, 26 are arranged so that opposite poles face each other (and thus attract). When the actuator 22 is in the rest, or off, position the magnets 24, 26 secure the actuator 22 to the housing 12. The actuator 22 is designed to move vertically along the vertical portion 14 of the housing 12 between the rest, off position and the on position. Because the actuator 22 is secured to the housing 12 using magnets 24, 26 it is easy to remove for cleaning thus ensuring an optimum hygienic environment. As will be described below a second pair of magnets 40, 42 is arranged to activate a switch 44 for operating the drink mixer 10.

When the actuator 22 is not in the resting, or off, position (and thus the magnets 24, 26 do not align to hold the actuator 22 in place) the actuator 22 is secured to the housing 12 using mechanical means. Opposing recesses 52 in the support member 20 are designed to receive complementary tab portions 54 which extend from a lower portion of the actuator 22, and a barrel screw 68 provides opposing recesses 70 designed to receive complementary tab portions 72 which extend from an upper portion of the actuator 22 to secure the actuator 22 to the housing 12 when the drink mixer 10 is in the on position.

The magnets 40, 42 activate the switch 44 via a generally L-shaped member 28 which is pivotably mounted within the housing 12. One end 30 of the L-shaped member 28 has two small wing portions 32 which engage with recesses 34 moulded into the housing 12 to provide the pivot point 36. The other end 38 of the L-shaped member 28 is attached to a third magnet 40 which rests against an inside wall of the housing 12. A fourth magnet 42 is attached on an inside wall of the actuator 22 and arranged to repel the third magnet 40. The third and fourth magnets 40, 42 are used to activate the switch 44 as described below.

The skilled addressee will recognize that more than a pair of opposing magnets can be used provided that the magnets are on both the actuator 22 and housing 12 so that the attractive or repulsive force is felt between the actuator 22 and housing 12.

The lower support member 20 is positioned below the first magnet 24 and extends through a rectangular aperture 58 in the actuator 22 to support the lower edge 50 of the cup, or container 18.

The actuator 22 is fitted over the housing 12 and is slidable up and down along the vertical portion 14 of the housing 12. The size of the aperture 58 relative to the support member 20 determines the distance the actuator 22 can move vertically. Movement of the actuator 22 up and down along the vertical portion 14 of the housing 12 acts to turn on/off the drink mixer 10.

When the actuator 22 is in the rest, or off, position, the upper face 56 of the rectangular aperture 58 rests against the upper face 60 of the support member 20, and the first and second magnets 24, 26 are attracted to each other thus securing the actuator 22 is to the housing 12. Preferably, the magnets 24, 26 are linearly offset (vertically) such that the second magnet 26 is slightly lower than the first magnet 24. The linear offset acts to hold the actuator 22 down on the support member 20 in the off position. The magnets 24, 26 hold the actuator 22 in place against the housing 12, and they also provide resistance to raising the actuator 22. Thus, the magnets 24, 26 act to bias the actuator 22 toward the rest, or off position, providing resistance to raising the actuator 22 which acts as a spring load holding the support member 20 against the upper lip portion 66 of the cup, or container 18, and as the cup, or container 18 is being removed provides assistance to return the actuator 22 to the rest, off position. As the actuator 22 is moved vertically toward the on position, the first and second magnets 24, 26 separate, and the tab portions 54 enter the recesses 52 preventing the lower section of the actuator 22 from being pulled away from the housing 12.

At the top end 62 of the actuator 22, on the side opposite the magnets 26, 42, is a retainer 64 designed to receive the upper lip portion 66 of the cup or container 18 while the drink mixer 10 is in operation. The retainer 64 may be integral with the actuator 22, or it may be a separate part, allowing for different mounting positions to accommodate different sized mixing cups or containers 18.

When a mixing cup or container 18 is loaded into the drink mixer 10 the upper lip portion 66 fits into the retainer 64, and as the loading continues the actuator 22 slides vertically upward, breaking the attraction between the first and second magnets 24, 26. At the same time, the tab portions 54, 72 slide into their respective recesses 52, 70 to secure the actuator 22 to the housing 12. During the loading process, the third and fourth magnets 40, 42 come into alignment and repel each other. Since the actuator 22 is secured to the housing 12, the third magnet 40 forces the L-shaped member to pivot, bearing against the switch 44 until sufficient force builds up to activate the switch 44 and turn the drink mixer 10 on.

Figure 4:
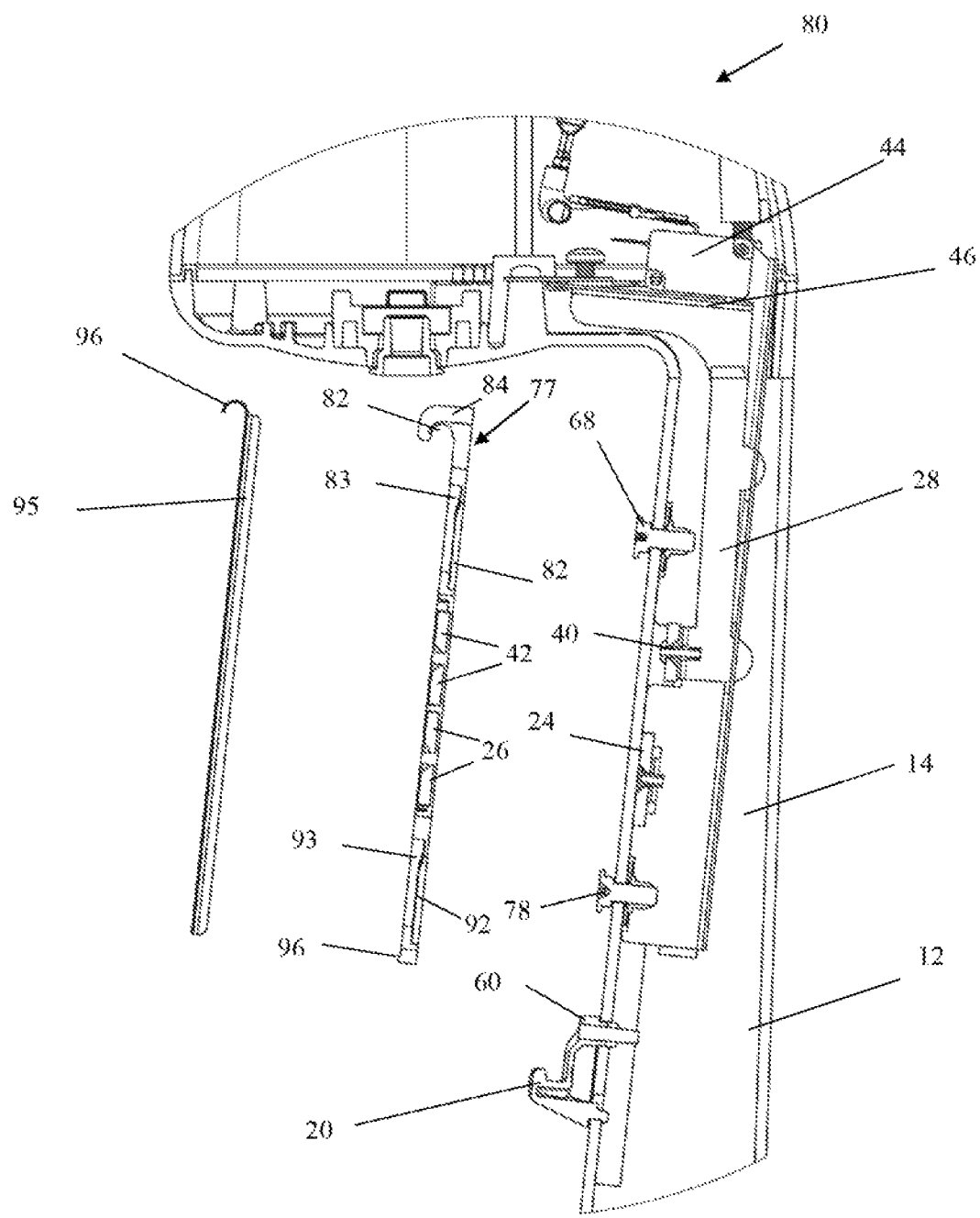
FIG. 4 is a partial cross sectional view of an appliance according to a further embodiment of the present invention.

A second embodiment of the invention is illustrated in FIG. 4. For convenience features of the drink mixer 80 of the second embodiment that are similar or correspond to features of the drink mixer 10 of the first embodiment have been referenced with the same reference numerals. The second embodiment seeks to further remove openings in the food zone.

On the outside of the housing 12 is a fixed lower support member 20 and a movable actuator 77. The actuator 77 is secured to the vertical portion 14 of the housing 12 using magnets 24, 26 and barrel screws 68, 78 engaging keyhole slots 82, 92. The first magnet 24 is positioned on an inside surface of the housing 12 and the second magnet 26 is positioned on the actuator 22. The magnets 24, 26 are arranged so that opposite poles face each other (and thus attract). When the actuator 77 is in the rest, or off, position the magnets 24, 26 secure the actuator 77 to the housing 12 in addition to the barrel screws 68, 78 in keyhole slots 82, 92. The actuator 77 is designed to move vertically along the vertical portion 14 of the housing 12 between the rest, off position and the on position. Because the actuator 77 is secured to the housing 12 using magnets 24, 26 and a barrel screw 68, 78 keyhole slot 82, 92 arrangement, it is easy to remove for cleaning thus ensuring an optimum hygienic environment. As will be described below a second pair of magnets 40, 42 is arranged to activate a switch 44 for operating the drink mixer 80.

When the actuator 77 is not in the resting, or off, position (and thus the magnets 24, 26 do not align to assist holding the actuator 22 in place) the actuator 77 is secured to the housing 12 using mechanical means of the barrel screws 68, 78 engaging keyhole slots 82, 92. Heads of barrel screws 68, 78 are designed to pass into a first region of key hole slots 82, 92 which has a diameter to receive the heads of barrel screws 86, 78 and moved into a slot region 83, 93. Slot region 83, 93 has a width to receive and allow movement of the shank of the barrel screws 68, 78 within the slot but does not allow the head of the barrel screws 68, 78 to pass through the slot to secure the actuator 22 to the housing 12 when the drink mixer 80 is in the on position.

The magnets 40, 42 activate the switch 44 via a generally L-shaped member 28 which is pivotably mounted within the housing 12. One end 30 of the L-shaped member 28 has two small wing portions 32 which engage with recesses 34 moulded into the housing 12 to provide the pivot point 36. The other end 38 of the L-shaped member 28 is attached to a third magnet 40 which rests against an inside wall of the housing 12. A fourth magnet 42 is attached on an inside wall of the actuator 77 and arranged to repel the third magnet 40. The third and fourth magnets 40, 42 are used to activate the switch 44 as described below.

The lower support member 20 is positioned below the first magnet 24 and is arranged to support the lower edge 50 of a cup, or container.

The actuator 77 is fitted over the housing 12 and is slidable up and down along the vertical portion 14 of the housing 12. The length of slots 83, 93 determines the distance the actuator 77 can move vertically. Movement of the actuator 77 up and down along the vertical portion 14 of the housing 12 acts to turn on/off the drink mixer 10.

When the actuator 77 is in the rest, or off, position, the lower edge 96 of the actuator 77 rests against the upper face 60 of the support member 20, and the first and second magnets 24, 26 are attracted to each other thus securing the actuator 22 to the housing 12 in addition to the above described keyhole slot 82, 92 attachment. Preferably, the magnets 24, 26 are linearly offset (vertically) such that the second magnet 26 is slightly lower than the first magnet 24. The linear offset acts to hold the actuator 77 down on the support member 20 in the off position. The magnets 24, 26 hold the actuator 77 in place against the housing 12, and they also provide resistance to raising the actuator 77. Thus, the magnets 24, 26 act to bias the actuator 77 toward the rest, or off position, providing resistance to raising the actuator 77 which acts as a spring load holding the support member 20 against the upper lip portion 66 of the cup, or container 18, and as the cup, or container 18 is being removed provides assistance to return the actuator 77 to the rest, off position. As the actuator 77 is moved vertically toward the on position, the first and second magnets 24, 26 separate, and the shank of barrel screws 68, 78 enter the slot regions 83, 93, with the heads of barrel screws 68, 78 preventing the lower section of the actuator 22 from being pulled away from the housing 12.

At the top end 82 of the actuator 77, on the side opposite the magnets 26, 42, is a retainer 84 designed to receive the upper lip portion of a cup or container while the drink mixer 10 is in operation. The retainer 84 may be integral with the actuator 77, or it may be a separate part, allowing for different mounting positions to accommodate different sized mixing cups or containers 18.

A cover 95 is located over the face of the actuator distal the housing 12. The cover 95 lies over the face of the actuator 77 so that openings on the actuator 77 are covered. The cover 95 includes a curved portion 96 that is arranged to conform to the retainer 84. The cover can be integral with the actuator 77, or may be a separate attachment.

When a mixing cup or container is loaded into the drink mixer 80 the upper lip portion fits into the retainer 84, and as the loading continues the actuator 77 slides vertically upward through the shank of barrel screw 68 and the shank of barrel screw 78 moving upwards in their respective slots 83, 93, breaking the attraction between the first and second magnets 24, 26. During the loading process, the third and fourth magnets 40, 42 come into alignment and repel each other. Since the actuator 77 is secured to the housing 12, though the heads of barrel screws 68, 78 being larger than slots 83, 93, the third magnet 40 forces the L-shaped member to pivot, bearing against the switch 44 until sufficient force builds up to activate the switch 44 and turn the drink mixer 80 on.

The skilled addressee will recognize that more than a pair of opposing magnets can be used provided that the magnets are on both the actuator 77 and housing 12 so that the attractive or repulsive force is felt between the actuator 77 and housing 12. This could include, 3, 4 or more magnets.

The above described preferred embodiments provide the advantage that there is no switch opening in the main body, or housing 12 of the drink mixer 10, 80. This prevents ingress of liquids into the housing 12 thus minimising risk of contamination of the switch 44. No opening also makes it easier to clean and reduces risk of cleaning fluids entering the housing 12.

The skilled addressee will recognise that the above described upwards movements of the actuator 22, 77 to switch the drinks mixer on could be altered to a downwards movement The simplified design, such as simple castings, mouldings, and metal pressings with no requirement for high tolerance machines finishes provides greater reliability and longer durability.

Although the invention has been described with reference to a specific example, it will be appreciated by those skilled in the art that the invention may be embodied in other forms.

The invention claimed is:

1. An appliance including:
a housing;
an actuator movable relative to the housing;
a switch disposed within the housing;
at least one set of repelling magnets configured to remotely operate the switch; and
at least one set of attracting magnets configured to retain the actuator on the housing.

2. The appliance of claim 1, wherein the at least one set of repelling magnets includes a first repelling magnet disposed within the housing and a second repelling magnet disposed on the actuator.

3. The appliance of claim 1, wherein the at least one set of attracting magnets includes a first attracting magnet disposed within the housing and a second attracting magnet disposed on the actuator.

4. The appliance of claim 1, wherein the actuator is removable from the housing.

5. The appliance of any claim 1, wherein the actuator is movable between an off position and an operating position, and wherein in the off position, the attracting magnets align to secure the actuator to the housing.

6. The appliance of claim 5, wherein in the operating position the repelling magnets align to remotely activate the switch, and the actuator is secured to the housing via a mechanical coupling.

7. The appliance of claim 6, wherein the mechanical coupling includes tab portions extending from the actuator and being slidable within corresponding recesses on the housing.

8. The appliance of claim 1, including a lever mechanism pivotally connected within the housing and operatively associated with the repelling magnets to activate the switch.

9. The appliance of any claim 1, wherein the actuator is biased toward the off position.

10. The appliance of any claim 1, wherein the appliance is a drink mixer.

11. The appliance of claim 10, wherein the drink mixer includes a support member extending from the housing and through an aperture in the actuator, the support member configured to engage a bottom portion of a container.

12. The appliance of claim 11, wherein the drink mixer includes a retaining member configured to engage a top portion of the container.

\* \* \* \* \*